W. E. COFFIN.
HAND BRAKE MECHANISM.
APPLICATION FILED AUG. 12, 1919.
1,431,569.
Patented Oct. 10, 1922.
2 SHEETS—SHEET 1.
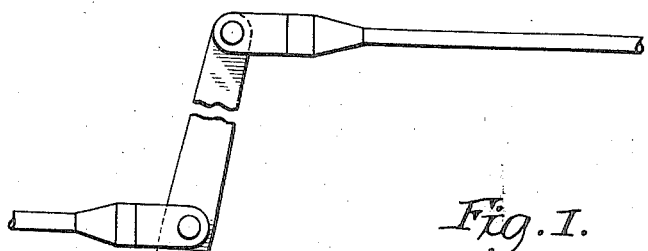
Fig. 1.
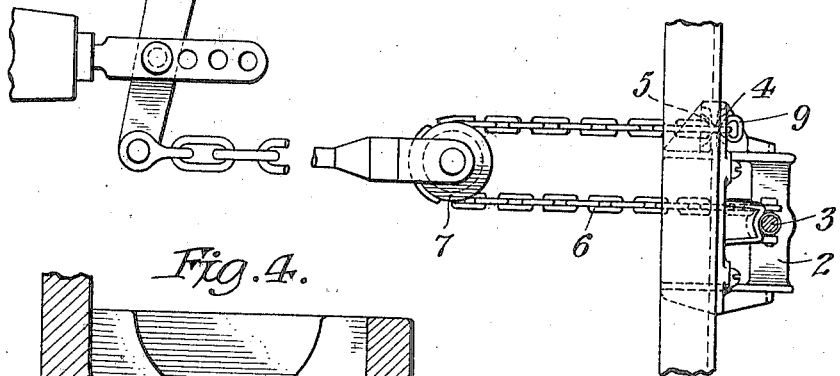
Fig. 4.
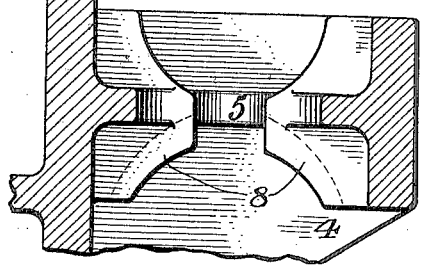
Fig. 3.
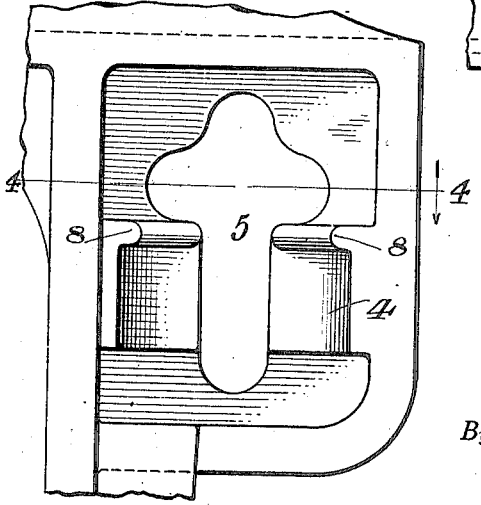
Fig. 2.
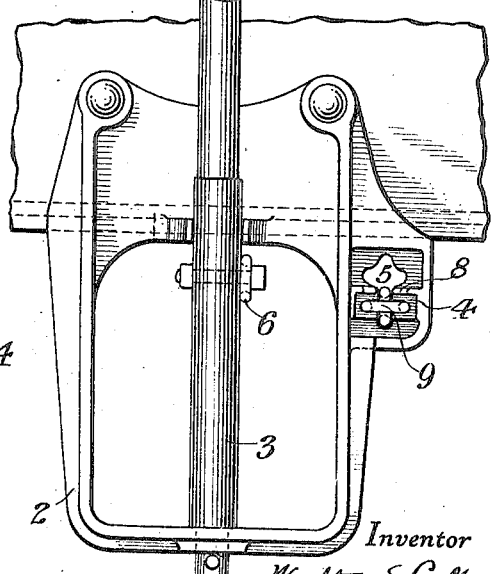
Inventor
Walter E. Coffin
Clarence D. Kerr
By his Attorney

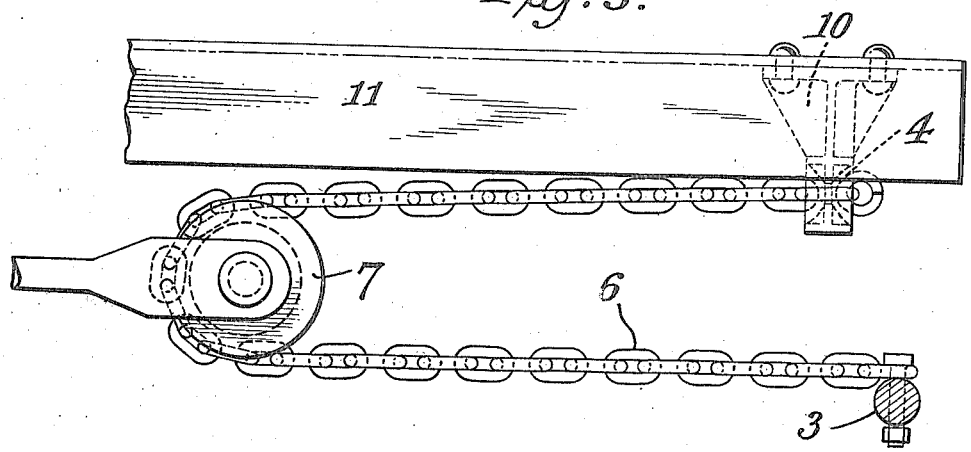
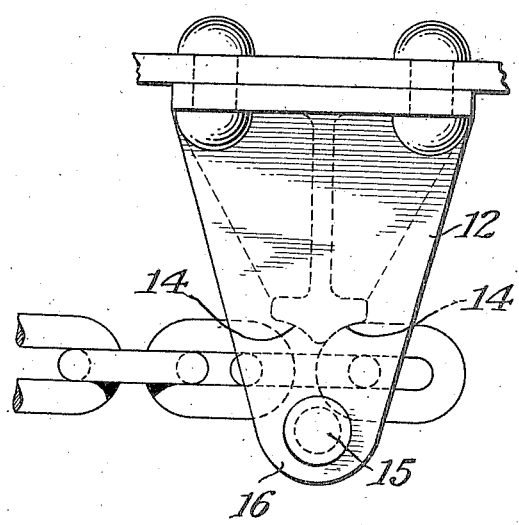
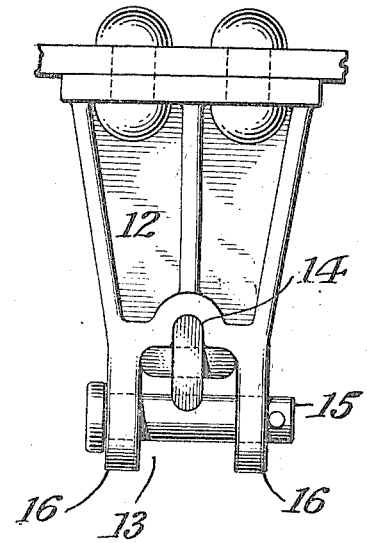

Patented Oct. 10, 1922.

1,431,569

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

HAND-BRAKE MECHANISM.

Application filed August 12, 1919. Serial No. 317,012.

*To all whom it may concern:*

Be it known that I, WALTER E. COFFIN, a citizen of the United States, residing at Cleveland, Cuyahoga County, Ohio, have invented new and useful Improvements in Hand-Brake Mechanism, of which the following is a specification, reference being had to the accompanying drawings, in which—

Fig. 1 is a plan showing the application of my invention to a hand brake mechanism; Fig. 2 is an elevation of the step for the brake shaft; Fig. 3 is a detail of socket for taking up the slack in the brake chain; Fig. 4 is a section on line 4—4 of Fig. 3; Fig. 5 shows a plan of a modified form of my invention; and Figs. 6 and 7 show a plan and elevation of a further modification thereof.

My invention relates to hand brake mechanism and comprises means for taking up the slack in the brake chain. My invention also consists in the construction and arrangement of parts which I shall hereinafter describe and claim.

Referring to the drawings, 2 indicates the step for the brake shaft 3, on one side of which is formed a socket 4, having a T-shaped opening 5 therethrough, which is preferably integral with the step 2. The brake chain 6 is attached at one end to the brake shaft 3 in the usual manner, is passed around a shive 7 to the rear of the step, and is secured at its other end in the lower portion of the opening 5.

Arranged in line with the central portion of the opening 5 are ribs 8 which extend outwardly and prevent the chain from working up into the larger or upper part of the opening 5. When it is desired to take up slack in the chain 6, the link 9 on the forward side of the socket 4 is seized and pulled forwardly sufficiently to allow the link to clear the ribs 8. It is then lifted into the upper or larger part of the opening, pulled forwardly by hand until the slack is taken up, and a succeeding link is then slipped down into the slot or lower portion of the opening. The link immediately in front of the link seated in the slot portion of the opening 5 lies across the slot and prevents the retraction of the chain through the slot. The chain is also kept under a slight tension by its own weight and that of the shive 7, so that regardless of slack, it cannot jar loose and work out of the slot past the ribs 8.

In Fig. 5 I have shown a modification of my invention, in which the slack adjusting mechanism is designed for application to existing hand brake installations on railway cars. As in the preferred form, the brake chain 6 is attached at one end to the brake shaft 3 in the usual manner, is passed around a shive 7 to the rear of the step, and is secured at its other end in a socket 4. In this case, however, the socket 4 is formed in a separate bracket 10, preferably riveted to a car center sill 11.

In Figs. 6 and 7, I have shown a further modification of the slack adjusting mechanism also designed for use with existing installations, in which a separate bracket 12 is also used. The bracket 12 has an open slot 13 and depressions 14 therein conforming to the shape of curved end portions of adjacent alternate links. The chain is secured by means of a pin 15, which extends across the slot 13, seats in apertures in the lugs 16 and holds the chain in the slot 13 and the depressions 14. To take up slack in the chain, the pin 15 is withdrawn from the lugs 16 and when the chain has been pulled tight, the pin is again inserted.

I have found that the mechanism which I have described, is practical and reliable in operation and has the advantage of being very simple in construction and easy of access and adjustment.

The terms and expressions which I have employed are used as terms of description and not of limitation, and I have no intention, in the use of such terms and expressions, of excluding any mechanical equivalents of the features shown and described, or portions thereof, but recognize that various structural modifications are possible within the scope of the invention claimed.

What I claim is:

1. In hand brake mechanism, a brake step, a brake shaft mounted on the brake step, a socket having an opening having portions of different cross section, and a brake chain, one end of the chain being attached to the shaft and the other in a narrow portion of said opening, the chain being normally held from movement when in the narrow portion of the said opening, and being capable of being moved into a wider portion of said opening to take up slack.

2. In hand brake mechanism, a brake step, a shaft mounted on the brake step, a socket, and a brake chain, one end of the chain being attached to the shaft and the other being removably secured in the socket, and means to prevent accidental disengagement of the chain from the socket when in operative position, one of the links of the chain forming the engagement with the socket, the axis of said link being arranged substantially in line with the axis of that part of the chain extending away from the socket.

3. In hand brake mechanism, a brake step, a shaft mounted on the brake step, a brake chain, a socket on the step, one end of the chain being attached to the shaft and the other to the socket, the socket having a slot in which the chain is adjustably secured, and ribs to prevent the accidental disengagement of the chain from the socket.

4. In hand brake mechanism, a brake step, a shaft mounted on the brake step, a brake chain, a socket on the step having a T-shaped opening therein, one end of the chain being attached to the shaft and the other in the leg of the T-shaped opening, and means for retaining the end of the chain in the leg of said socket opening.

WALTER E. COFFIN.